United States Patent
Nagano

(10) Patent No.: US 11,240,418 B2
(45) Date of Patent: Feb. 1, 2022

(54) ELECTRONIC DEVICE AND CONTROL METHOD THEREOF

(71) Applicant: CANON KABUSHIKI KAISHA, Tokyo (JP)

(72) Inventor: Hideaki Nagano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/841,316

(22) Filed: Apr. 6, 2020

(65) Prior Publication Data

US 2020/0336649 A1 Oct. 22, 2020

(30) Foreign Application Priority Data

Apr. 18, 2019 (JP) .............................. JP2019-079485

(51) Int. Cl.
*H04N 5/232* (2006.01)

(52) U.S. Cl.
CPC ............................. *H04N 5/23209* (2013.01)

(58) Field of Classification Search
CPC ................................................ H04N 5/23209
See application file for complete search history.

(56) References Cited

U.S. PATENT DOCUMENTS

2013/0258179 A1* 10/2013 Shintani ............... H04N 5/2254
348/371

FOREIGN PATENT DOCUMENTS

JP 2013-207325 A 10/2013

* cited by examiner

*Primary Examiner* — Twyler L Haskins
*Assistant Examiner* — Fayeza A Bhuiyan
(74) *Attorney, Agent, or Firm* — Canon U.S.A., Inc. I.P. Division

(57) ABSTRACT

An electronic device includes a connection unit, a communication unit configured to communicate with a first external device or a second external device, and a control unit configured to control the electronic device. The control unit controls the electronic device so that at least one terminal of the connection unit is connected to the communication unit in a case where the first external device is connected to the connection unit. The control unit controls the electronic device so that at least one terminal of the connection unit is connected to the control unit in a case where the second external device is connected to the connection unit.

17 Claims, 11 Drawing Sheets

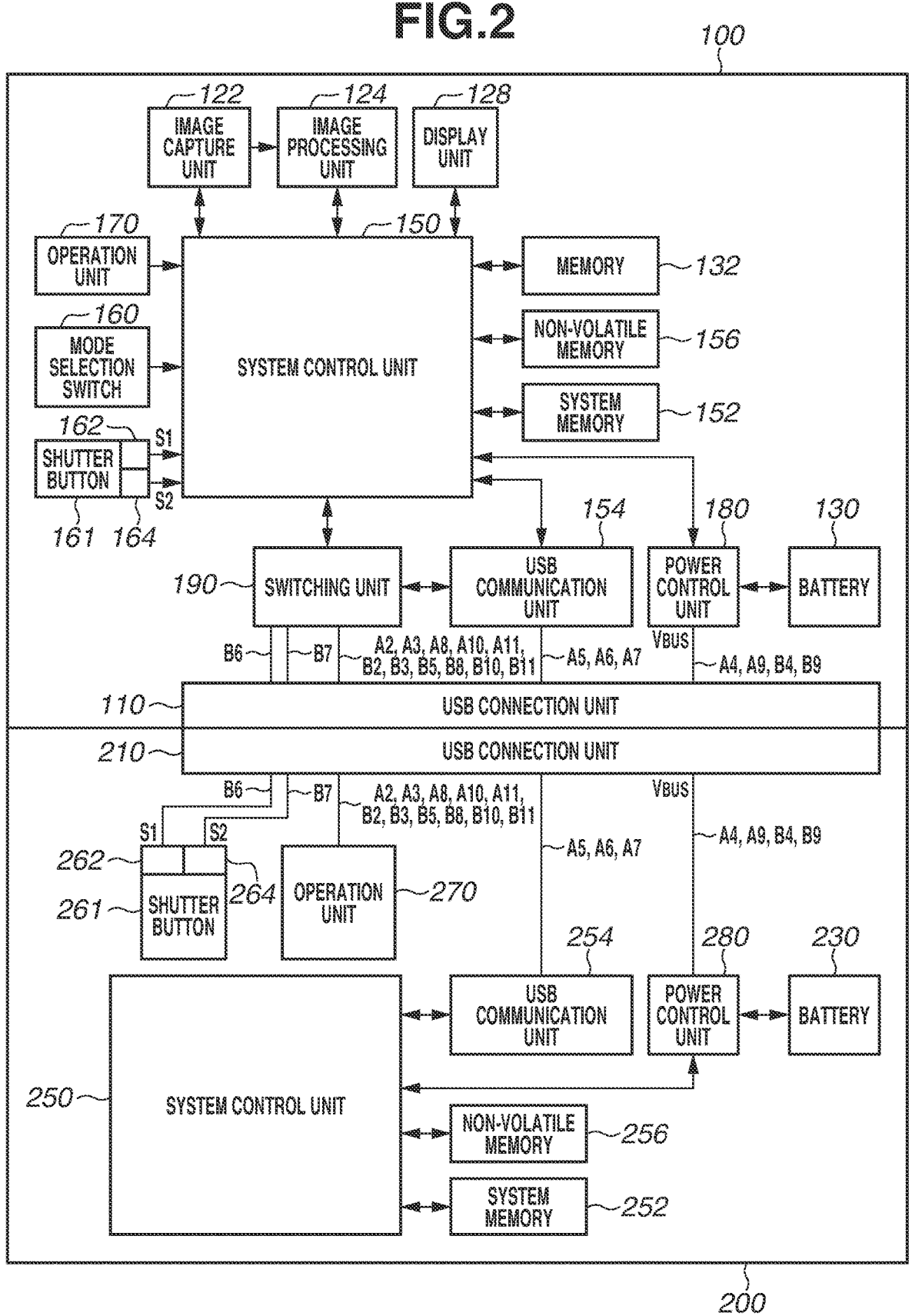

FIG.3A

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

FIG.3B

| A1 | A2 | A3 | A4 | A5 | A6 | A7 | A8 | A9 | A10 | A11 | A12 |
|---|---|---|---|---|---|---|---|---|---|---|---|
| GND | OPERATION 1 | OPERATION 2 | VBUS | CC1 | D+ | D- | OPERATION 3 | VBUS | OPERATION 4 | OPERATION 5 | GND |
| GND | OPERATION 11 | OPERATION 10 | VBUS | OPERATION 9 | S2 | S1 | OPERATION 8 | VBUS | OPERATION 7 | OPERATION 6 | GND |
| B12 | B11 | B10 | B9 | B8 | B7 | B6 | B5 | B4 | B3 | B2 | B1 |

FIG.3C

| A12 | A11 | A10 | A9 | A8 | A7 | A6 | A5 | A4 | A3 | A2 | A1 |
|---|---|---|---|---|---|---|---|---|---|---|---|
| GND | OPERATION 5 | OPERATION 4 | VBUS | OPERATION 3 | D- | D+ | CC | VBUS | OPERATION 2 | OPERATION 1 | GND |
| GND | OPERATION 6 | OPERATION 7 | VBUS | OPERATION 8 | S1 | S2 | OPERATION 9 | VBUS | OPERATION 10 | OPERATION 11 | GND |
| B1 | B2 | B3 | B4 | B5 | B6 | B7 | B8 | B9 | B10 | B11 | B12 |

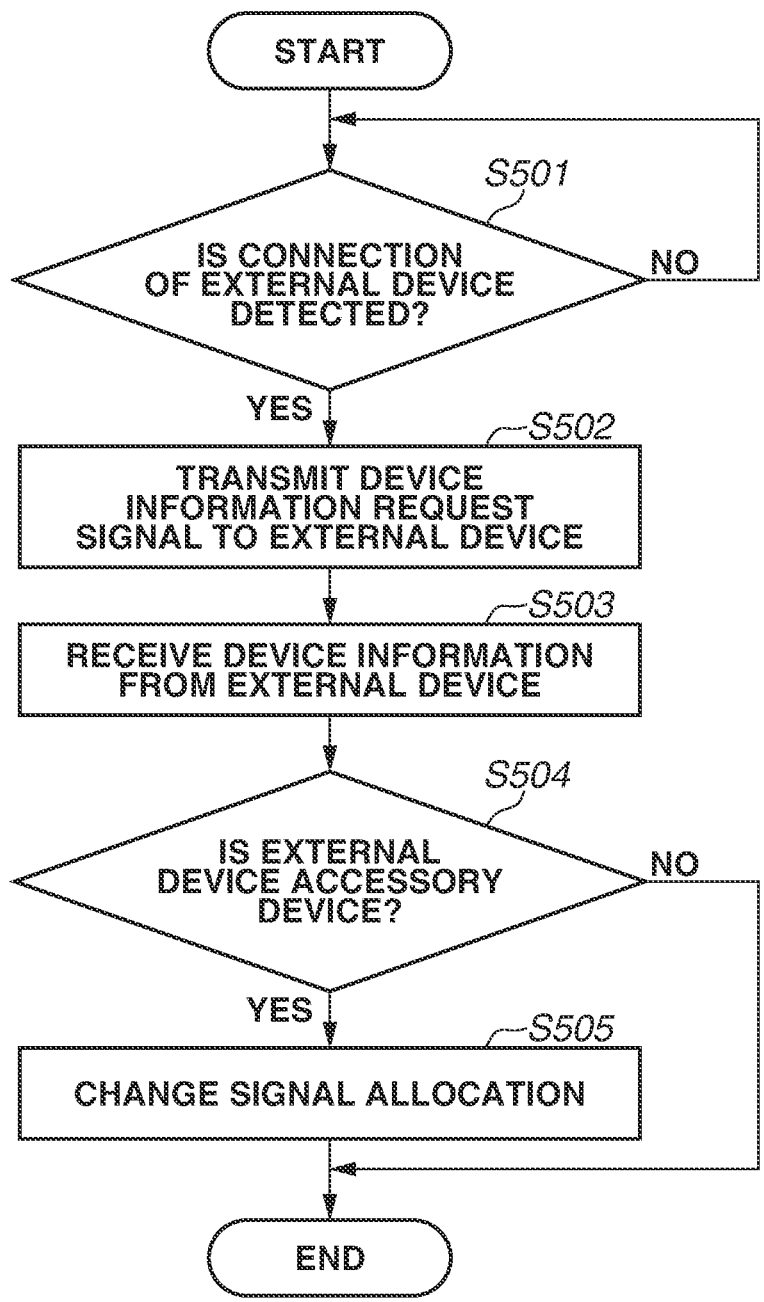

FIG. 7A

| A1 | A2 | A3 | A4 | A5 | A6 | A7 | A8 | A9 | A10 | A11 | A12 |
|---|---|---|---|---|---|---|---|---|---|---|---|
| GND | OPERATION 1 | OPERATION 2 | VBUS | CC1 | D+ | D- | OPERATION 3 | VBUS | OPERATION 4 | OPERATION 5 | GND |
| GND | OPERATION 11 | OPERATION 10 | VBUS | OPERATION 9 | D- | S2 | OPERATION 8 | VBUS | OPERATION 7 | OPERATION 6 | GND |
| B12 | B11 | B10 | B9 | B8 | B7 | B6 | B5 | B4 | B3 | B2 | B1 |

FIG. 7B

| A12 | A11 | A10 | A9 | A8 | A7 | A6 | A5 | A4 | A3 | A2 | A1 |
|---|---|---|---|---|---|---|---|---|---|---|---|
| GND | OPERATION 5 | OPERATION 4 | VBUS | OPERATION 3 | D- | D+ | CC1 | VBUS | OPERATION 2 | OPERATION 1 | GND |
| GND | OPERATION 6 | OPERATION 7 | VBUS | OPERATION 8 | S1 | S2 | OPERATION 9 | VBUS | OPERATION 10 | OPERATION 11 | GND |
| B1 | B2 | B3 | B4 | B5 | B6 | B7 | B8 | B9 | B10 | B11 | B12 |

FIG. 7C

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | CC | VBUS | RX2- | RX2+ | GND |
| GND | RX1+ | RX1- | VBUS | SBU2 | S2 | S1 | SBU1 | VBUS | TX2- | TX2+ | GND |
| B12 | B11 | B10 | B9 | B8 | B7 | B6 | B5 | B4 | B3 | B2 | B1 |

FIG. 7D

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2- | VBUS | SBU1 | D- | D+ | VCONN | VBUS | TX2- | TX2+ | GND |
| GND | TX1+ | TX1- | VBUS | CC | S1 | S2 | SBU2 | VBUS | RX1- | RX1+ | GND |
| B1 | B2 | B3 | B4 | B5 | B6 | B7 | B8 | B9 | B10 | B11 | B12 |

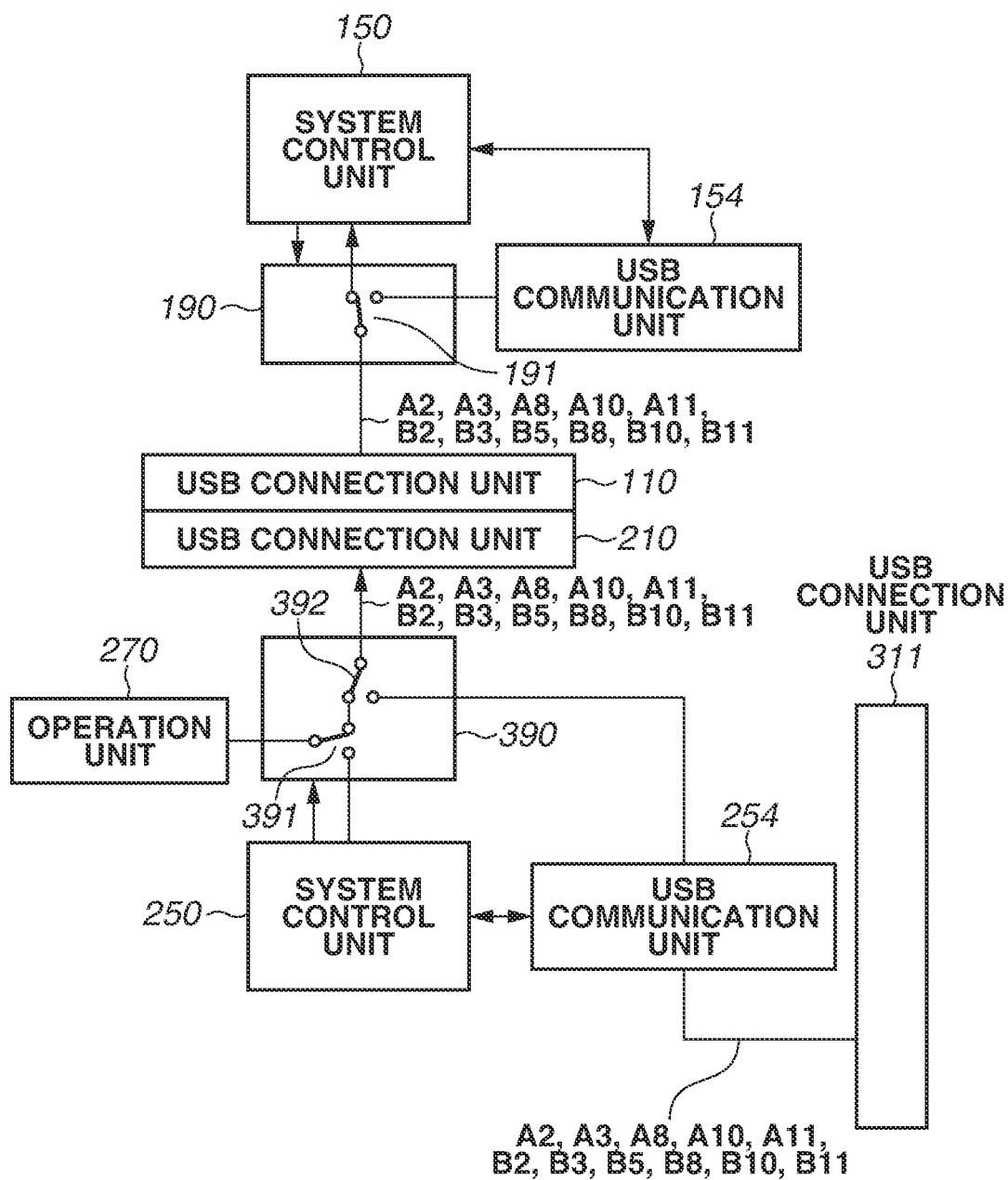

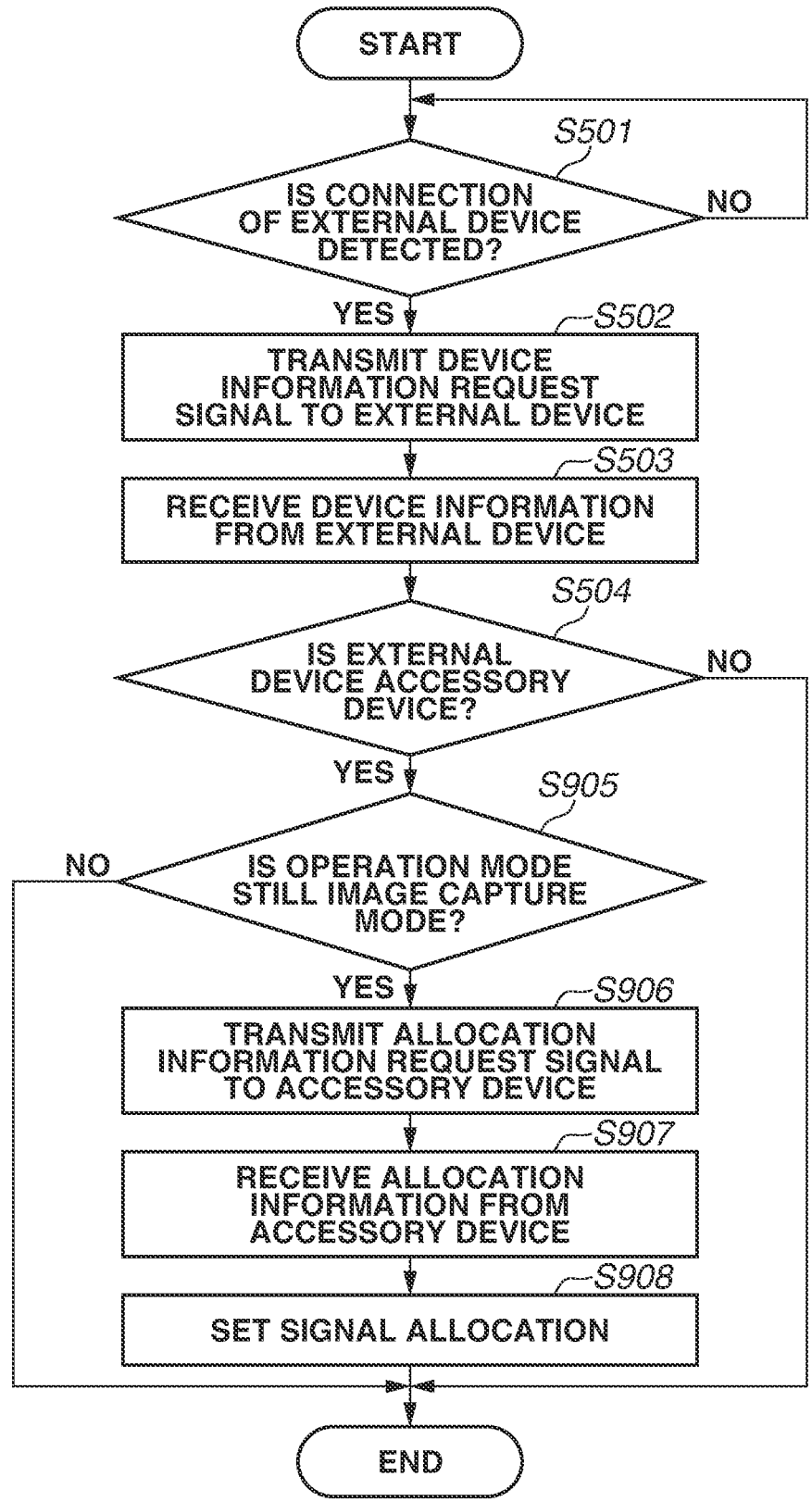

ELECTRONIC DEVICE AND CONTROL METHOD THEREOF

BACKGROUND

Field of the Disclosure

Aspects of the disclosure generally relate to an electronic device, a control method thereof, and programs relating thereto.

Description of the Related Art

A digital camera is known as an example of an electronic device that includes a universal serial bus (USB) connector. A battery grip is known as an example of an accessory device of a digital camera. A user can input an instruction to capture an image to a digital camera using an operation unit of a battery grip.

Japanese Patent Application Laid-Open No. 2013-207325 discusses an image capture device to which an accessory device such as an external flash unit is attachable.

Meanwhile, in a case where a digital camera is operated by using an operation unit of an external device such as an accessory device, a response speed is expected to be substantially equal to a response speed in a case where the digital camera is operated by using an operation unit of the digital camera. From a viewpoint of usability of the operation unit of the external device, the response speed of the operation unit of the external device is desirably substantially equal to the response speed of the operation unit of the digital camera. It is expected that the same applies to an electronic device other than a digital camera and an external device.

SUMMARY

According to an aspect of the embodiments, usability of an operation unit of an external device (e.g., accessory device) that is connected to an electronic device (e.g., image capture device) improves.

According to an aspect of the embodiments, there is provided an electronic device including a connection unit, a communication unit configured to communicate with a first external device or a second external device, and a control unit configured to control the electronic device, wherein the control unit controls the electronic device so that at least one terminal of the connection unit is connected to the communication unit, in a case where the first external device is connected to the connection unit, and wherein the control unit controls the electronic device so that at least one terminal of the connection unit is connected to the control unit, in a case where the second external device is connected to the connection unit.

According to an aspect of the embodiments, there is provided a method including connecting at least one terminal of a connection unit of an electronic device to a communication unit of the electronic device, in a case where a first external device is connected to the connection unit; and connecting at least one terminal of the connection unit to a control unit of the electronic device, in a case where a second external device is connected to the connection unit.

According to an aspect of the embodiments, there is provided a non-transitory storage medium storing a program that causes a computer to execute a method, the method including connecting at least one terminal of a connection unit of an electronic device to a communication unit of the electronic device in a case where a first external device is connected to the connection unit; and connecting at least one terminal of the connection unit to a control unit of the electronic device, in a case where a second external device is connected to the connection unit.

Further aspects of the embodiments will become apparent from the following embodiments.

BRIEF DESCRIPTION OF THE DRAWINGS

FIG. 2 is a block diagram illustrating components of the image capture device 100 and the accessory device 200 according to a first exemplary embodiment.

FIGS. 3A, 3B, and 3C are diagrams illustrating an example of signal allocation to terminals of a universal serial bus (USB) connection unit 110 and a USB connection unit 210.

FIG. 5 is a flowchart illustrating a control method of the image capture device 100.

FIGS. 7A, 7B, 7C, and 7D are diagrams illustrating an example of signal allocation to terminals of a universal serial bus (USB) connection unit 110 and a USB connection unit 210.

FIGS. 8A and 8B are block diagrams illustrating an example of connection between the USB connection units 110 and 210.

FIG. 9 is a flowchart illustrating a control method of the image capture device 100.

DESCRIPTION OF THE EMBODIMENTS

Exemplary embodiments, features, and aspects of the disclosure will be described below with reference to the drawings. However, aspects of the disclosure are not limited to the following embodiments.

Figure 1A:
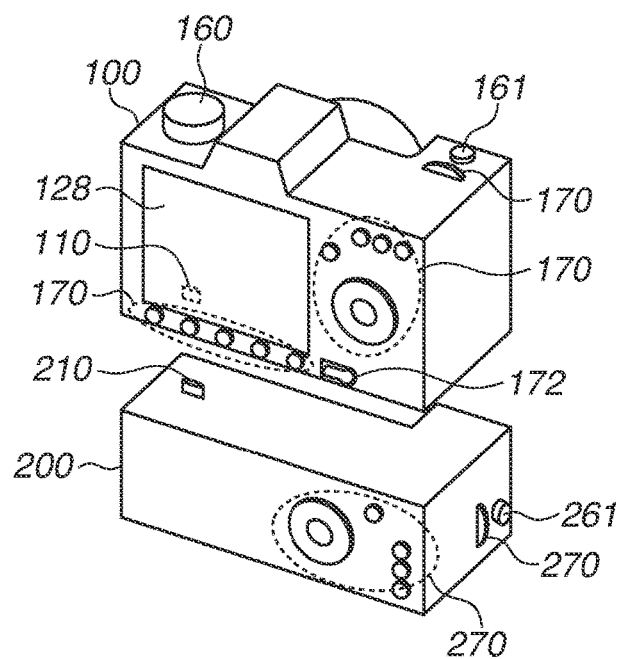
FIGS. 1A and 1B are perspective views illustrating an example of an external view of an image capture device 100 and an accessory device 200.
Figure 1B:
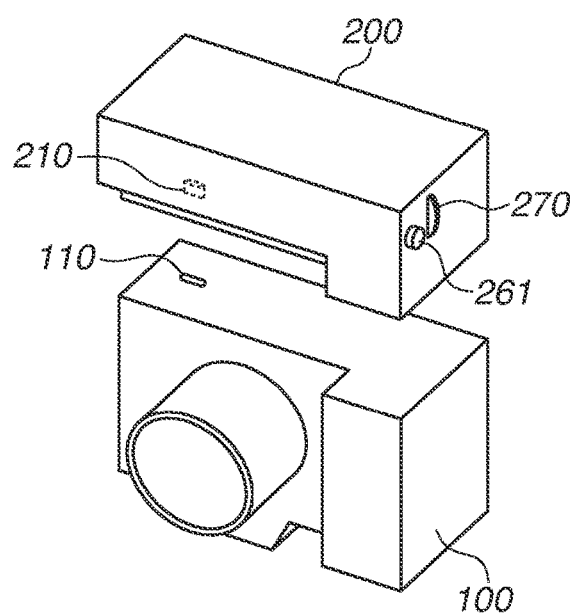

[First Exemplary Embodiment] FIGS. 1A and B are perspective views illustrating an example of an external view of an image capture device 100 and an accessory device 200 according to a first exemplary embodiment. FIG. 1A is a rear perspective view, and FIG. 1B is a front perspective view.

The image capture device 100 is an electronic device and is, for example, a digital camera. The image capture device 100 includes a universal serial bus (USB) connection unit 110, a display unit 128, a mode selection switch 160, a shutter button 161, an operation unit 170, and a power switch 172.

The USB connection unit 110 is a connector that is provided to a lower surface of the image capture device 100 and is used to connect to an external device, such as the accessory device 200, a personal computer, or a printer. The USB connection unit 110 is a USB Type-C receptacle-shaped connector.

The display unit 128 is provided to a rear surface of the image capture device 100 and displays one or more images, one or more pieces of information, or both. The mode selection switch 160 is an operation unit that is provided to an upper surface of the image capture device 100 and is used to change an operation mode of the image capture device 100 from one operation mode to another operation mode. The shutter button 161 is an operation unit that is provided to the upper surface of the image capture device 100 and is used to input an instruction to capture an image. The operation unit 170 includes a switch, a button, a dial, and a touch panel to receive a user instruction. The power switch 172 is an operation unit that is provided to the rear surface of the image capture device 100 and is used to turn on and off the image capture device 100.

The accessory device 200 is an electronic device and is, for example, a battery grip capable of outputting an image capture instruction signal. The accessory device 200 includes a USB connection unit 210, a shutter button 261, and an operation unit 270.

The USB connection unit 210 is a connector that is provided to an upper surface of the accessory device 200 and is used to connect to the USB connection unit 110 of the image capture device 100. The USB connection unit 210 is a USB Type-C plug-shaped connector.

The shutter button 261 is an operation unit that is provided to a side surface of the accessory device 200 and is used to input an instruction to capture an image. The operation unit 270 includes a switch, a button, and a dial to receive a user instruction. The accessory device 200 transmits an operation signal from the shutter button 261 or the operation unit 270 to the image capture device 100 via the USB connection unit 210.

FIG. 2 is a block diagram illustrating components of the image capture device 100 and the accessory device 200 according to the first exemplary embodiment.

First, the components of the image capture device 100 will be described below. The image capture device 100 includes the USB connection unit 110, an image capture unit 122, an image processing unit 124, the display unit 128, a battery 130, a memory 132, a system control unit 150, a system memory 152, a USB communication unit 154, and a non-volatile memory 156. The image capture device 100 further includes the mode selection switch 160, the shutter button 161, a first shutter switch 162, a second shutter switch 164, the operation unit 170, a power control unit 180, and a switching unit 190.

The image capture unit 122 is an image sensor consisting of a charge-coupled device (CCD) sensor or a complementary metal oxide semiconductor (CMOS) sensor and generates image data from an optical subject image that enters through a lens unit. The image processing unit 124 performs a predetermined image process on image data generated by the image capture unit 122. The system control unit 150 performs exposure control and focal point adjustment control on the lens unit based on a result of the image process performed by the image processing unit 124. In this way, a through-the-lens (TTL) auto-focus (AF) process, an auto-exposure (AE) process, and a pre-flash (EF) process are performed. Further, the image processing unit 124 performs the image process on the image data generated by the image capture unit 122 and performs a TTL auto white balance (AWB) process based on a result of the image process.

The display unit 128 displays an image or a graphical user interface (GUI) image of a GUI on a display device such as a liquid crystal display (LCD).

The system control unit 150 writes the image data generated by the image capture unit 122 or the image processing unit 124 and image data to be displayed on the display unit 128 to the memory 132. The memory 132 has a sufficient capacity to store a predetermined number of still images or a predetermined length of time of moving images and audio.

The system control unit 150 includes a processor (e.g., hardware processor) and a work memory. The system control unit 150 executes a program stored in the non-volatile memory 156 to control the components of the image capture device 100.

The non-volatile memory 156 is an electrically erasable and recordable memory and is, for example, an electrically erasable programmable read-only memory (EEPROM). The non-volatile memory 156 stores a program that is executable by the system control unit 150. Further, the non-volatile memory 156 stores information for a process of allocating a signal of a terminal of the USB connection unit 110, which will be described below.

The system memory 152 is, for example, a random access memory (RAM) and stores a constant number and a variable number for use in the system control unit 150. The system control unit 150 performs control so that an image or a GUI image for display is written to the memory 132, and the written image or the written GUI image is displayed on the display unit 128.

The mode selection switch 160, the first shutter switch 162, the second shutter switch 164, and the operation unit 170 each output an operation signal based on a user operation to the system control unit 150.

The mode selection switch 160 changes the operation mode of the image capture device 100 to a still image capture mode, a moving image capture mode, or a reproduction mode.

When the shutter button 161 is half-pressed, the first shutter switch 162 is changed to an ON state and outputs a first shutter switch signal S1, which is an image capture preparation instruction signal, to the system control unit 150. The system control unit 150 starts the AF process, the AE process, the AWB process, and the EF process based on the first shutter switch signal S1.

When the shutter button 161 is fully-pressed, the second shutter switch 164 is changed to an ON state and outputs a second shutter switch signal S2, which is an image capture instruction signal, to the system control unit 150. The system control unit 150 starts an image capture process based on the second shutter switch signal S2 so that the image capture unit 122 generates image data. The image data generated by the image capture unit 122 is processed by the image processing unit 124, and the processed image data is written to the memory 132.

The operation unit 170 is operable by a user and outputs an operation signal corresponding to a user operation to the system control unit 150. The operation unit 170 includes, for example, a push-button, a rotary dial, and a touch sensor.

The power control unit 180 includes a detection circuit for detecting the battery 130 and a direct current-direct current (DC-DC) converter. The power control unit 180 determines whether the battery 130 is connected to the image capture device 100 and determines a remaining amount of the battery 130. The power control unit 180 supplies power from the battery 130 to the components of the image capture device 100. Further, the power control unit 180 can supply power supplied from the accessory device 200 via the USB connection unit 110 to the components of the image capture device 100.

The battery 130 is a chargeable battery such as a lithium ion battery. The power control unit 180 can charge the battery 130 with the power supplied from the accessory device 200 via the USB connection unit 110.

The USB connection unit 110 is the USB Type-C receptacle-shaped connector and includes a plurality of terminals A1 to A12 and B1 to B12. The plurality of terminals A1 to A12 and B1 to B12 is electrically connectable to a plurality of terminals A1 to A12 and B1 to B12 of the USB connection unit 210 of the accessory device 200. The image capture device 100 can supply power to an external device (e.g., accessory device 200) via the USB connection unit 110, can receive power from the external device via the USB connection unit 110, and can communicate with the external device via the USB connection unit 110.

The terminals A2, A3, A8, A10, A11, B2, B3, B5, B6, B7, B8, B10, and B11 of the USB connection unit 110 are connected to the switching unit 190. The terminals A5, A6, and A7 of the USB connection unit 110 are connected to the USB communication unit 154. The terminals A4, A9, B4, and B9 of the USB connection unit 110 are connected to the power control unit 180.

The USB communication unit 154 performs data communication based on a USB standard (e.g., the USB 3.1 standard, the USB Type-C standard) with a USB communication unit 254 of the accessory device 200 connected to the USB connection unit 110.

The switching unit 190 switches signal allocation of the terminals A1 to A12 and B1 to B12 in the USB connection unit 110 based on an instruction from the system control unit 150. The switching unit 190 switches a connection destination of a predetermined terminal in the USB connection unit 110 to the USB communication unit 154 or the system control unit 150. Consequently, the image capture device 100 can communicate either with an external device based on the USB Type-C standard or with the accessory device 200.

Next, the components of the accessory device 200 will be described below. The accessory device 200 includes the USB connection unit 210, a battery 230, a system control unit 250, a system memory 252, the USB communication unit 254, a non-volatile memory 256, the shutter button 261, a first shutter switch 262, and a second shutter switch 264. The accessory device 200 further includes the operation unit 270 and a power control unit 280.

The system control unit 250 includes a processor (e.g., hardware processor) and a work memory. The system control unit 150 executes a program stored in the non-volatile memory 256 to control the components of the accessory device 200.

The non-volatile memory 256 is an electrically erasable and recordable memory and is, for example, an EEPROM. The non-volatile memory 256 stores a program that is executable by the system control unit 250. Further, the non-volatile memory 256 stores device information to be transmitted to the image capture device 100.

The system memory 252 is, for example, a RAM and stores a constant number and a variable number for use in the system control unit 250.

When the shutter button 261 is half-pressed, the first shutter switch 262 is changed to an ON state and outputs the first shutter switch signal S1, which is an image capture preparation instruction signal, to the system control unit 150 of the image capture device 100 via the USB connection unit 210. The system control unit 150 starts the AF process, the AE process, the AWB process, and the EF process based on the first shutter switch signal S1.

When the shutter button 261 is fully-pressed, the second shutter switch 264 is changed to an ON state and outputs the second shutter switch signal S2, which is an image capture instruction signal, to the system control unit 150 of the image capture device 100 via the USB connection unit 210. The system control unit 150 starts an image capture process based on the second shutter switch signal S2 so that the image capture unit 122 generates image data. The image data generated by the image capture unit 122 is processed by the image processing unit 124, and the processed image data is written to the memory 132.

The operation unit 270 is operable by a user and outputs a control signal corresponding to a user operation to the system control unit 150 of the image capture device 100 via the USB connection unit 210. The operation unit 270 includes, for example, a push-button, a rotary dial, and a touch sensor.

The power control unit 280 includes a detection circuit for detecting the battery 230 and a DC-DC converter. The power control unit 280 determines whether the battery 230 is connected to the accessory device 200 and determines a remaining amount of the battery 230. The power control unit 280 supplies power from the battery 230 to the components of the accessory device 200. Further, the power control unit 280 can supply power to the image capture device 100 via the USB connection unit 210.

The battery 230 is a chargeable battery such as a lithium ion battery.

The USB connection unit 210 is the USB Type-C plug-shaped connector and includes the plurality of terminals A1 to A12 and B1 to B12. The plurality of terminals A1 to A12 and B1 to B12 is electrically connectable to the plurality of terminals A1 to A12 and B1 to B12 of the USB connection unit 110 of the image capture device 100. The accessory device 200 is connected to the image capture device 100 via the USB connection unit 210.

The terminal B6 of the USB connection unit 210 is connected to the first shutter switch 262. The terminal B7 of the USB connection unit 210 is connected to the second shutter switch 264. The terminals A2, A3, A8, A10, A11, B2, B3, B5, B8, B10, and B11 of the USB connection unit 210 are connected to the operation unit 270. The terminals A5, A6, and A7 of the USB connection unit 210 are connected to the USB communication unit 254. The terminals A4, A9, B4, and B9 of the USB connection unit 210 are connected to the power control unit 280.

The USB communication unit 254 performs data communication based on the USB standard (e.g., the USB 3.1 standard, the USB Type-C standard) with the USB communication unit 154 of the image capture device 100 connected to the USB connection unit 210.

FIG. 3A illustrates an example of signal allocation to the terminals A1 to A12 and B1 to B12 of the USB connection unit 110 of the image capture device 100 in an initial state. FIG. 3B illustrates an example of signal allocation to the terminals A1 to A12 and B1 to B12 of the USB connection unit 110 of the image capture device 100 in a case where the image capture device 100 is connected to the accessory device 200. FIG. 3C illustrates an example of signal allocation to the terminals A1 to A12 and B1 to B12 of the USB connection unit 210 of the accessory device 200.

The USB connection unit 110 includes 24 terminals A1 to A12 and B1 to B12. The USB connection unit 210 includes 24 terminals A1 to A12 and B1 to B12, similarly to the USB connection unit 110. The switching unit 190 switches the signal allocation to the terminals A2, A3, A8, A10, A11, B2, B3, B5, B6, B7, B8, B10, and B11 of the USB connection unit 110 based on an instruction from the system control unit 150.

In the initial state, signals are allocated to the terminals A1 to A12 and B1 to B12 of the USB connection unit 110 of the image capture device 100 as illustrated in FIG. 3A. The signal allocation illustrated in FIG. 3A is signal allocation based on the USB Type-C standard. In the initial state, the image capture device 100 can communicate with an external device that is connected to the USB connection unit 110 and is based on the USB Type-C standard. In a state where no external device is connected to the USB connection unit 110 of the image capture device 100, signals are also allocated to the terminals A1 to A12 and B1 to B12 of the USB connection unit 110 as illustrated in FIG. 3A. In the initial state, the image capture device 100 waits for an external device to be connected.

In a state where the image capture device 100 is connected to the accessory device 200, signals are allocated to the terminals A1 to A12 and B1 to B12 of the USB connection unit 110 of the image capture device 100 as illustrated in FIG. 3B.

As illustrated in FIG. 3B, the first shutter switch signal S1 is allocated to the terminal B6 of the USB connection unit 110, and the second shutter switch signal S2 is allocated to the terminal B7 of the USB connection unit 110. Operation signals from the operation unit 270 are allocated to the terminals A2, A3, A8, A10, A11, B2, B3, B5, B8, B10, and B11 of the USB connection unit 110.

In the state where the image capture device 100 is connected to the accessory device 200, signals are allocated to the terminals A1 to A12 and B1 to B12 of the USB connection unit 210 of the accessory device 200 as illustrated in FIG. 3C.

As illustrated in FIG. 3C, the first shutter switch signal S1 is allocated to the terminal B6 of the USB connection unit 210, and the second shutter switch signal S2 is allocated to the terminal B7 of the USB connection unit 210. Operation signals from the operation unit 270 are allocated to the terminals A2, A3, A8, A10, A11, B2, B3, B5, B8, B10, and B11 of the USB connection unit 210.

Figure 4A:
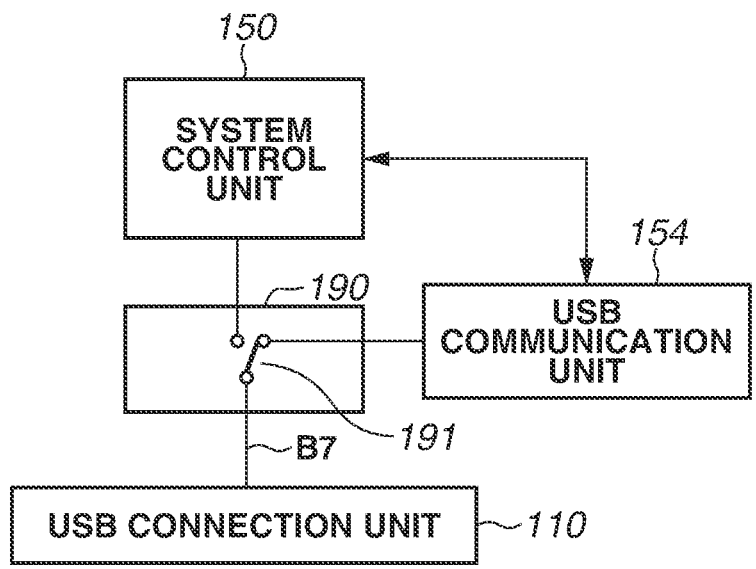
FIGS. 4A and 4B are block diagrams illustrating an example of connection between the USB connection units 110 and 210.

FIG. 4A is a block diagram illustrating an example of an operation of the switching unit 190 for allocating the signals in the initial state in FIG. 3A.

The switching unit 190 includes a switch 191. In the initial state, as illustrated in FIG. 4A, the switch 191 connects the terminal B7 of the USB connection unit 110 to the system control unit 150 via the USB communication unit 154 based on an instruction from the system control unit 150. Similarly, the switch 191 connects the terminals A2, A3, A8, A10, A11, B2, B3, B5, B6, B8, B10, and B11 of the USB connection unit 110 to the system control unit 150 via the USB communication unit 154 based on an instruction from the system control unit 150. Consequently, the signals are allocated to the terminals A1 to A12 and B1 to B12 of the USB connection unit 110 as illustrated in FIG. 3A.

Figure 4B:
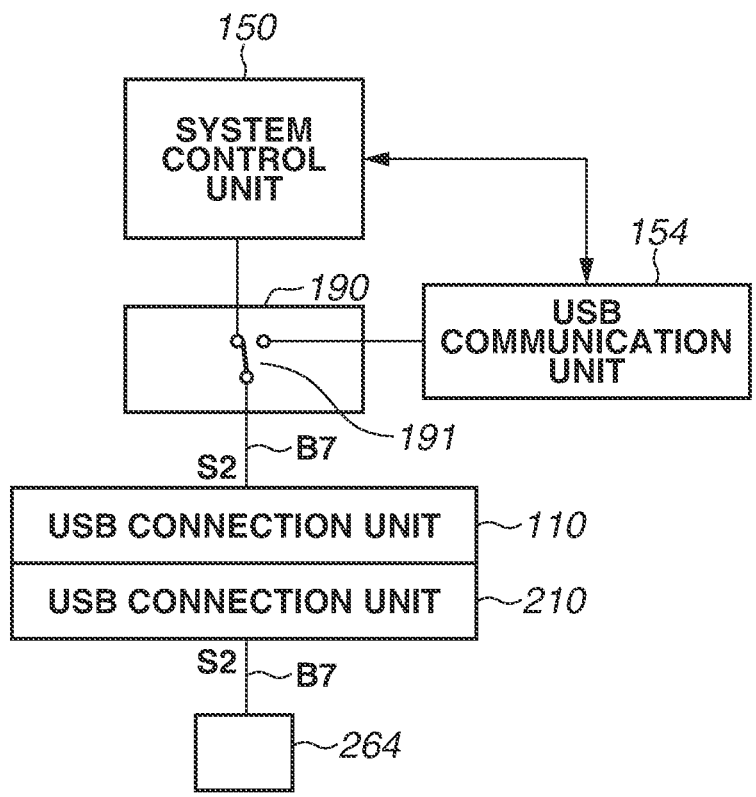

FIG. 4B is a block diagram illustrating an example of an operation of the switching unit 190 for allocating the signals in the state where the image capture device 100 is connected to the accessory device 200 in FIG. 3B.

In the state where the image capture device 100 is connected to the accessory device 200, as illustrated in FIG. 4B, the USB connection unit 110 is connected to the USB connection unit 210. The switch 191 of the switching unit 190 connects the terminal B7 of the USB connection unit 110 to the system control unit 150 based on an instruction from the system control unit 150. Similarly, the switch 191 connects the terminals A2, A3, A8, A10, A11, B2, B3, B5, B6, B8, B10, and B11 of the USB connection unit 110 to the system control unit 150 based on an instruction from the system control unit 150. The switch 191 connects the terminals A2, A3, A8, A10, A11, B2, B3, B5, B6, B7, B8, B10, and B11 of the USB connection unit 110 to the system control unit 150. Consequently, the signals are allocated to the terminals A1 to A12 and B1 to B12 of the USB connection unit 110 as illustrated in FIG. 3B.

Next, a process of allocating the signals to the terminals A1 to A12 and B1 to B12 of the USB connection unit 110 of the image capture device 100 will be described below. The image capture device 100 and the accessory device 200 are connected to each other via the USB connection units 110 and 210. Thus, the image capture device 100 and the accessory device 200 can communicate an operation signal from the shutter button 261 or the operation unit 270 of the accessory device 200 with each other via the USB communication units 154 and 254.

However, in a case where the USB communication units 154 and 254 transmit an operation signal of the accessory device 200, presence of the USB communication units 154 and 254, decreases a response speed of the shutter button 261 or the operation unit 270 of the accessory device 200. In particular, if the response speed of the shutter button 261 is decreased, a user may miss a shutter release opportunity. Thus, as illustrated in FIG. 4B, the switching unit 190 connects a terminal of the USB connection unit 110 to the system control unit 150. The shutter button 261 or the operation unit 270 of the accessory device 200 outputs an operation signal to the system control unit 150 not via the USB communication units 154 and 254. In this way, the response speed of the shutter button 261 or the operation unit 270 of the accessory device 200 becomes substantially equal to the response speed of the shutter button 161 or the operation unit 170 of the image capture device 100.

FIG. 5 is a flowchart illustrating an example of a control method of the image capture device 100. In the initial state, the system control unit 150 controls the switching unit 190 to set the signal allocation to the terminals A1 to A12 and B1 to B12 of the USB connection unit 110 as illustrated in FIG. 3A. The switching unit 190 connects the terminals A2, A3, A8, A10, A11, B2, B3, B5, B6, B7, B8, B10, and B11 of the USB connection unit 110 to the system control unit 150 via the USB communication unit 154 as illustrated in FIG. 4A.

In step S501, the system control unit 150 detects whether an external device is connected to the USB connection unit 110 via the USB communication unit 154. The external device refers to the accessory device 200, a personal computer, or a printer. If the system control unit 150 does not detect that the external device is connected to the USB connection unit 110 (NO in step S501), the system control unit 150 repeats step S501 until the system control unit 150 detects that the external device is connected to the USB connection unit 110. If the system control unit 150 detects that the external device is connected to the USB connection unit 110 (YES in step S501), the system control unit 150 advances the process to step S502.

In step S502, the system control unit 150 controls the USB communication unit 154 so that a device information request signal is transmitted to the external device. The USB communication unit 154 transmits the device information request signal to the external device via the USB connection unit 110.

The device information request signal is, for example, a signal for requesting device information about the external device. The device information about the external device refers to identification information (device identification (device ID)) about the external device. Alternatively, the device information request signal can be a signal for requesting switching information that indicates whether the signal allocation to the terminals A1 to A12 and B1 to B12 of the USB connection unit 110 in FIG. 3A needs to be switched to the signal allocation to the terminals A1 to A12 and B1 to B12 of the USB connection unit 110 in FIG. 3B.

If the external device receives the device information request signal from the image capture device 100, the external device transmits device information that specifies a type of the external device to the image capture device 100. In a case where the external device is the accessory device 200, if the system control unit 250 of the accessory device 200 receives the device information request signal from the image capture device 100 via the USB communication unit 254, the system control unit 250 transmits the device information stored in the non-volatile memory 256 to the image capture device 100.

In step S503, the system control unit 150 receives the device information from the external device via the USB connection unit 110 and the USB communication unit 154.

In step S504, the system control unit 150 determines whether the connected external device is the accessory device 200 capable of outputting an image capture instruction signal based on the received device information. The accessory device 200 is, for example, a battery grip.

For example, the non-volatile memory 156 stores table information that specifies the device information about the accessory device 200 capable of outputting an image capture instruction signal. The system control unit 150 refers to the table information stored in the non-volatile memory 156. In a case where the received device information is contained in the table information, the system control unit 150 determines that the connected external device is the accessory device 200 capable of outputting the image capture instruction signal. In a case where the received device information is not contained in the table information, the system control unit 150 determines that the connected external device is not the accessory device 200 capable of outputting the image capture instruction signal.

For example, in a case where the received device information about the external device is the device information about the accessory device 200 capable of outputting an image capture instruction signal, the system control unit 150 determines that the connected external device is the accessory device 200 capable of outputting an image capture instruction signal. In a case where the received device information about the external device is not the device information about the accessory device 200 capable of outputting an image capture instruction signal, the system control unit 150 determines that the connected external device is not the accessory device 200 capable of outputting an image capture instruction signal.

In a case where the system control unit 150 determines that the connected external device is the accessory device 200 capable of outputting an image capture instruction signal (YES in step S504), the system control unit 150 advances the process to step S505. In a case where the system control unit 150 determines that the connected external device is not the accessory device 200 capable of outputting an image capture instruction signal (NO in step S504), the flowchart in FIG. 5 is ended.

In step S505, the system control unit 150 controls the switching unit 190 to change the signal allocation to the terminals A1 to A12 and B1 to B12 of the USB connection unit 110 in FIG. 3A to the signal allocation to the terminals A1 to A12 and B1 to B12 of the USB connection unit 110 in FIG. 3B. The switching unit 190 connects the terminals A2, A3, A8, A10, A11, B2, B3, B5, B6, B7, B8, B10, and B11 of the USB connection unit 110 to the system control unit 150 as illustrated in FIG. 4B. Then, the flowchart in FIG. 5 is ended.

As described above, in the case where the system control unit 150 determines that the accessory device 200 capable of outputting an image capture instruction signal is connected to the USB connection unit 110 in step S504 (YES in step S504), the system control unit 150 advances the process to step S505. In step S505, as illustrated in FIG. 4B, the system control unit 150 controls the switching unit 190 so that at least one of the terminals A1 to A12 and B1 to B12 of the USB connection unit 110 are connected to the system control unit 150.

In a case where an external device that is not the accessory device 200 capable of outputting an image capture instruction signal is connected to the USB connection unit 110 (NO in step S504), the system control unit 150 controls the switching unit 190 as illustrated in FIG. 4A. In this case, the system control unit 150 controls the switching unit 190 so that at least one of the terminals A1 to A12 and B1 to B12 of the USB connection unit 110 are connected to the system control unit 150 via the USB communication unit 154 as illustrated in FIG. 4A.

Figure 6:
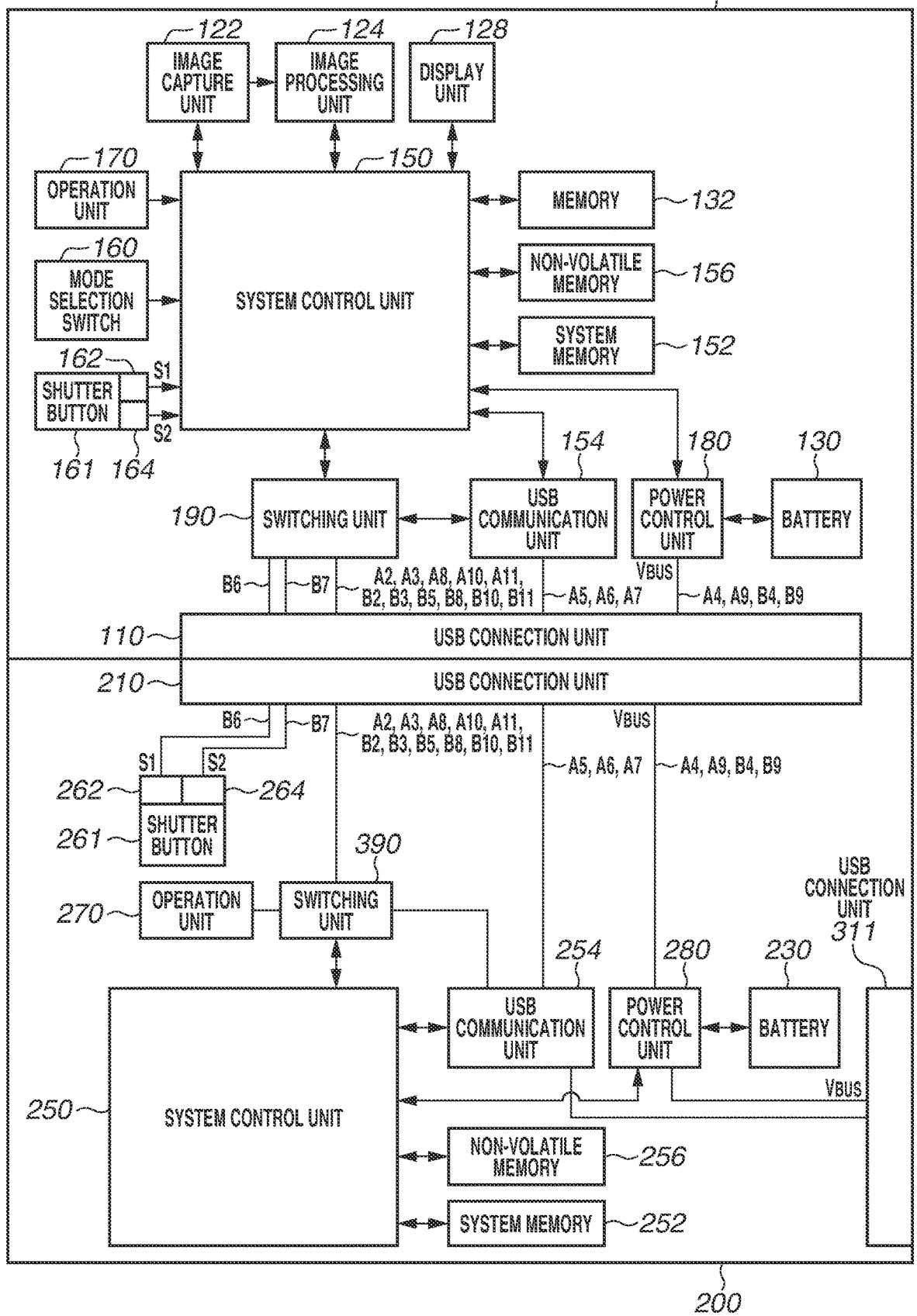
FIG. 6 is a block diagram illustrating components of an image capture device 100 and an accessory device 200 according to a second exemplary embodiment.

[Second Exemplary Embodiment] FIG. 6 is a block diagram illustrating components of an image capture device 100 and an accessory device 200 according to a second exemplary embodiment.

A configuration of the image capture device 100 in FIG. 6 is the same as the configuration of the image capture device 100 in FIG. 2. The accessory device 200 in FIG. 6 includes a USB connection unit 311 and a switching unit 390 in addition to the configuration of the accessory device 200 in FIG. 2. Differences between the second exemplary embodiment and the first exemplary embodiment will be described below.

First, the components of the image capture device 100 according to the second exemplary embodiment will be described below. The non-volatile memory 156 stores a program for executing a process illustrated in a flowchart in FIG. 9, which will be described below. The system control unit 150 executes the program stored in the non-volatile memory 156 to perform the process illustrated in the flowchart in FIG. 9.

Next, the components of the accessory device 200 according to the second exemplary embodiment will be described below. The non-volatile memory 256 stores a program for executing a process illustrated in a flowchart in FIG. 10, which will be described below. The system control unit 250 executes the program stored in the non-volatile memory 256 to perform the process illustrated in the flowchart in FIG. 10. The non-volatile memory 256 stores table information that specifies first allocation information and second allocation information to be transmitted to the image capture device 100, which will be described below.

The USB connection unit 311 is a USB Type-C receptacle-shaped connector and is electrically connectable to an external device. The accessory device 200 supplies power to the external device (e.g., image capture device 100) via the USB connection unit 311, receives power from the external device via the USB connection unit 311, and communicates with the external device via the USB connection unit 311.

The power control unit 280 charges the battery 230 with the power supplied from the external device connected to the USB connection unit 311 based on an instruction from the system control unit 250. The USB communication unit 254 performs data communication based on the USB standard (e.g., the USB 3.1 standard, the USB Type-C standard) with the external device connected to the USB connection unit 311 based on an instruction from the system control unit 250.

The switching unit 390 is connected to the USB connection unit 210, the operation unit 270, the USB communication unit 254, and the system control unit 250. The switching unit 390 switches a connection destination of the terminals A2, A3, A8, A10, A11, B2, B3, B5, B8, B10, and B11 of the USB connection unit 210 to the USB communication unit 254 or the operation unit 270 based on an instruction from the system control unit 250.

The operation unit 270 outputs an operation signal to the USB connection unit 210 via the USB communication unit 254 under control by the switching unit 390 or outputs an operation signal not via the USB communication unit 254 but directly to the USB connection unit 210 under control by the switching unit 390. The system control unit 250 controls the switching unit 390 based on whether the external device is connected to the USB connection unit 311. In this way, the accessory device 200 can selectively perform communication with the image capture device 100 based on the USB Type-C standard and communication according to the first exemplary embodiment. Details thereof will be described below.

FIG. 7A illustrates an example of signal allocation to the terminals A1 to A12 and B1 to B12 of the USB connection unit 110 of the image capture device 100. FIG. 7A illustrates the signal allocation to the terminals A1 to A12 and B1 to B12 of the USB connection unit 110 of the image capture device 100 in a case where the USB connection unit 110 of the image capture device 100 is connected to the USB connection unit 210 of the accessory device 200 and the USB connection unit 311 of the accessory device 200 is not connected to the external device. The signal allocation in FIG. 7A is the same as the signal allocation in FIG. 3B.

FIG. 7B illustrates an example of signal allocation to the terminals A1 to A12 and B1 to B12 of the USB connection unit 210 of the accessory device 200. FIG. 7B illustrates the signal allocation to the terminals A1 to A12 and B1 to B12 of the USB connection unit 210 in the case where the USB connection unit 110 of the image capture device 100 is connected to the USB connection unit 210 of the accessory device 200 and the USB connection unit 311 of the accessory device 200 is not connected to the external device. The signal allocation in FIG. 7B is the same as the signal allocation in FIG. 3C.

FIG. 7C illustrates an example of signal allocation to the terminals A1 to A12 and B1 to B12 of the USB connection unit 110 of the image capture device 100. FIG. 7C illustrates the signal allocation to the terminals A1 to A12 and B1 to B12 of the USB connection unit 110 of the image capture device 100 in a case where the USB connection unit 110 of the image capture device 100 is connected to the USB connection unit 210 of the accessory device 200 and the USB connection unit 311 of the accessory device 200 is connected to the external device.

FIG. 7D illustrates an example of signal allocation to the terminals A1 to A12 and B1 to B12 of the USB connection unit 210 of the accessory device 200. FIG. 7D illustrates the signal allocation to the terminals A1 to A12 and B1 to B12 of the USB connection unit 210 in a case where the USB connection unit 110 of the image capture device 100 is connected to the USB connection unit 210 of the accessory device 200 and the USB connection unit 311 of the accessory device 200 is connected to the external device.

FIGS. 7C and 7D are different from FIG. 3A in that the first shutter switch signal S1 is allocated to the terminal B6 and the second shutter switch signal S2 is allocated to the terminal B7.

In a case where the external device is not connected to the USB connection unit 311, the switching unit 190 allocates the signals as illustrated in FIG. 7A, whereas in a case where the external device is connected to the USB connection unit 311, the switching unit 190 allocates the signals as illustrated in FIG. 7C.

In the case where the external device is not connected to the USB connection unit 311, the switching unit 390 allocates the signals as illustrated in FIG. 7B, whereas in a case where the external device is connected to the USB connection unit 311, the switching unit 390 allocates the signals as illustrated in FIG. 7D. The switching unit 390 controls connection destinations of the terminals A2, A3, A8, A10, A11, B2, B3, B5, B8, B10, and B11 of the USB connection unit 210.

In the USB Type-C standard on which the USB connection unit 210 is based, the terminals B6 and B7 are free terminals. Thus, the first shutter switch 262 is allocated to the terminal B6 of the USB connection unit 210, and the second shutter switch 264 is allocated to the terminal B7 of the USB connection unit 210. Consequently, the first shutter switch signal S1 is allocated to the terminal B6 of the USB connection unit 210, and the second shutter switch signal S2 is allocated to the terminal B7 of the USB connection unit 210, as illustrated in FIGS. 7B and 7D.

First, the case where the external device is not connected to the USB connection unit 311 will be described below with reference to FIGS. 7A and 7B. In this case, the signal allocation to the terminals A1 to A12 and B1 to B12 of the USB connection unit 210 of the accessory device 200 is as illustrated in FIG. 7B. An initial state of the USB connection unit 210 of the accessory device 200 is as illustrated in FIG. 7B. The signal allocation to the terminals A1 to A12 and B1 to B12 of the USB connection unit 110 of the image capture device 100 is as illustrated in FIG. 7A. The state illustrated in FIG. 7A is the same as the state illustrated in FIG. 3B, and the state illustrated in FIG. 7B is the same as the state illustrated in FIG. 3C.

Next, the case where the external device is connected to the USB connection unit 311 will be described below with reference to FIGS. 7C and 7D. The signal allocation to the terminals A1 to A12 and B1 to B12 of the USB connection unit 210 of the accessory device 200 is as illustrated in FIG. 7D. The signal allocation to the terminals A1 to A12 and B1 to B12 of the USB connection unit 110 of the image capture device 100 is as illustrated in FIG. 7C. The first shutter switch signal S1 is allocated to the terminals B6 of the USB connection units 110 and 210, and the second shutter switch signal S2 is allocated to the terminals B7 of the USB connection units 110 and 210. The signal allocation to the terminals other than the terminals B6 and B7 of the USB connection units 110 and 210 is signal allocation based on the USB Type-C standard. Thus, the image capture device 100 and the accessory device 200 can communicate with each other based on the USB Type-C standard. The accessory device 200 communicates with the external device connected to the USB connection unit 311 based on the USB Type-C standard and communicates with the image capture device 100 connected to the USB connection unit 210 based on the USB Type-C standard. The image capture device 100 can communicate with the external device connected to the USB connection unit 311 of the accessory device 200 based on the USB Type-C standard via the accessory device 200.

FIG. 8A is a block diagram illustrating an example of operation of the switching units 190 and 390 for allocating the signals as illustrated in FIGS. 7A and 7B.

The switching unit 190 includes the switch 191. The switching unit 390 includes switches 391 and 392. The USB connection unit 110 is connected to the USB connection unit 210. The terminals A2, A3, A8, A10, A11, B2, B3, B5, B8, B10, and B11 of the USB connection unit 311 are connected to the USB communication unit 254.

In the case where the external device is not connected to the USB connection unit 311, the switching units 190 and 390 operate as illustrated in FIG. 8A. The switches 391 and 392 connect the operation unit 270 to the terminals A2, A3, A8, A10, A11, B2, B3, B5, B8, B10, and B11 of the USB connection unit 210. The switch 191 connects the terminals A2, A3, A8, A10, A11, B2, B3, B5, B6, B7, B8, B10, and B11 of the USB connection unit 110 to the system control unit 150. The operation unit 270 is connected to the system control unit 150 not via the USB communication units 254 and 154. Consequently, the signals are allocated to the USB connection unit 110 as illustrated in FIG. 7A, and the signals are allocated to the USB connection unit 210 as illustrated in FIG. 7B.

Figure 8B:
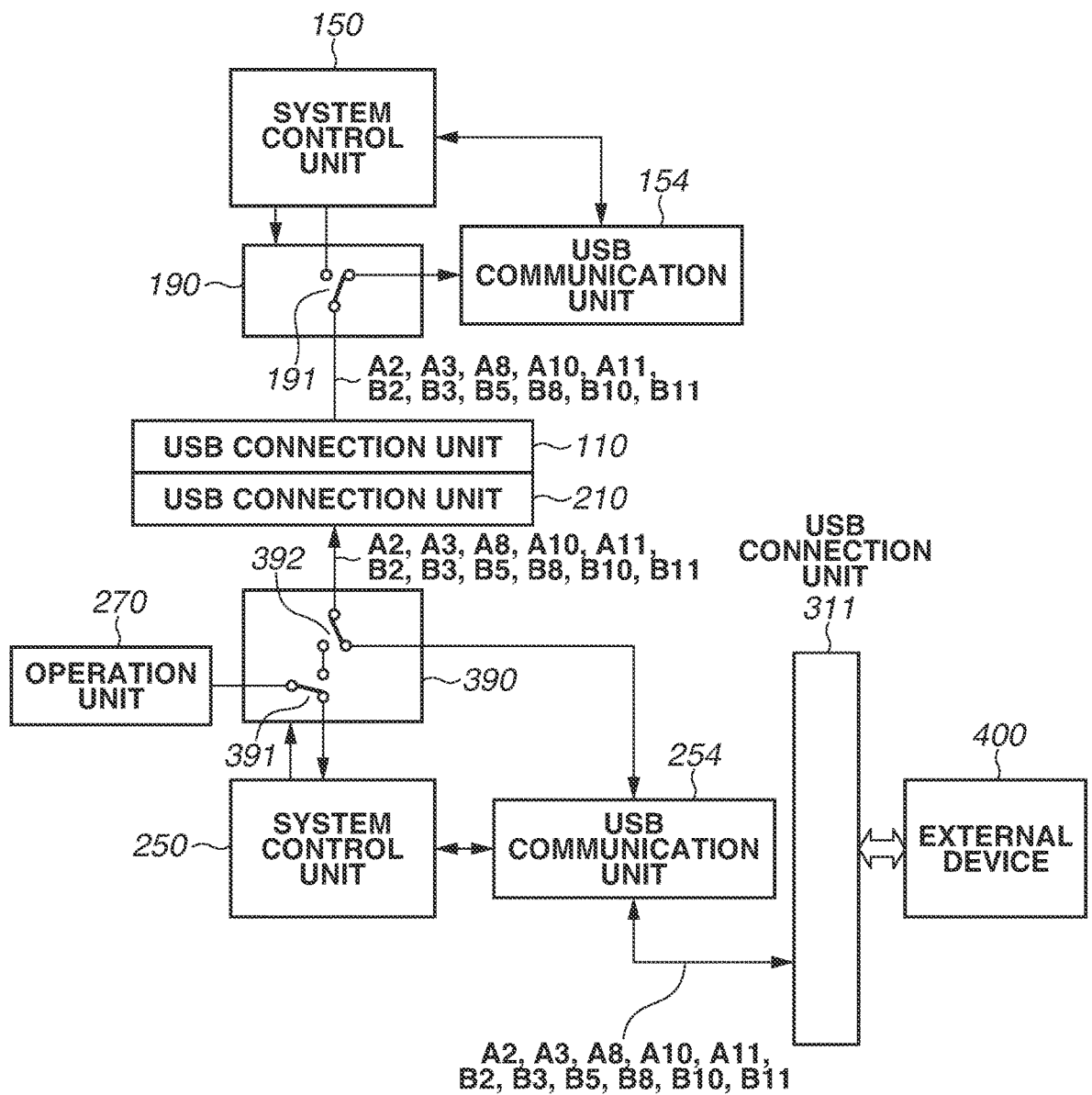

FIG. 8B is a block diagram illustrating an example of operation of the switching units 190 and 390 for allocating the signals as illustrated in FIGS. 7C and 7D.

The switching unit 190 includes the switch 191. The switching unit 390 includes the switches 391 and 392. The USB connection unit 110 is connected to the USB connection unit 210.

In a case where an external device 400 is connected to the USB connection unit 311, the switching units 190 and 390 operate as illustrated in FIG. 8B. The switches 391 and 392 connect the operation unit 270 to the terminals A2, A3, A8, A10, A11, B2, B3, B5, B8, B10, and B11 of the USB connection unit 210 via the system control unit 250 and the USB communication unit 254. The switch 191 connects the terminals A2, A3, A8, A10, A11, B2, B3, B5, B6, B7, B8, B10, and B11 of the USB connection unit 110 to the system control unit 150 via the USB communication unit 154. The operation unit 270 is connected to the system control unit 150 via the system control unit 250 and the USB communication units 254 and 154. The USB communication unit 254 inputs an operation signal from the operation unit 270 via the system control unit 150 and transmits the operation signal as USB communication data to the USB communication unit 154 of the image capture device 100. The USB communication unit 154 receives the operation signal as the USB communication data and outputs the operation signal to the system control unit 150. Consequently, the signals are allocated to the USB connection unit 110 as illustrated in FIG. 7C, and the signals are allocated to the USB connection unit 210 as illustrated in FIG. 7D.

Further, the external device 400 is connected to the system control unit 150 via the USB connection unit 311, the USB communication unit 254, the USB connection unit 210, the USB connection unit 110, and the USB communication unit 154. The image capture device 100 can perform USB communication with the external device 400 via the accessory device 200.

Next, a process of allocating the signals to the terminals A1 to A12 and B1 to B12 of the USB connection unit 110 of the image capture device 100 and a process of allocating the signals to the terminals A1 to A12 and B1 to B12 of the USB connection unit 210 of the accessory device 200 will be described below. The accessory device 200 includes the USB connection unit 311 that is connectable to the external device. The image capture device 100 can communicate with the external device connected to the USB connection unit 311 based on the USB Type-C standard via the accessory device 200. In the communication based on the USB Type-C standard, communication based on the USB 2.0 standard and communication based on the USB 3.1 standards, which is faster than the communication based on the USB 2.0 standards, can be performed.

In FIG. 7B, the operation signals from the operation unit 270 are allocated to the terminals A2, A3, A8, A10, A11, B2, B3, B5, B6, B7, B8, B10, and B11 of the USB connection unit 210. In this case, the image capture device 100 cannot communicate with the external device connected to the USB connection unit 311 of the accessory device 200 based on the USB 3.1 standard.

Thus, in the case where the external device is connected to the USB connection unit 311, the signals are allocated to the USB connection unit 110 as illustrated in FIG. 7C, and the signals are allocated to the USB connection unit 210 as illustrated in FIG. 7D. Consequently, the image capture device 100 can communicate with the external device connected to the USB connection unit 311 of the accessory device 200 based on the USB 3.1 standard. In the case where the external device is not connected to the USB connection unit 311, the signals are allocated to the USB connection unit 110 as illustrated in FIG. 7A, and the signals are allocated to the USB connection unit 210 as illustrated in FIG. 7B.

The first shutter switch signal S1 and the second shutter switch signal S2 are respectively allocated to the terminals B6 and B7, which are free terminals based on the USB Type-C standard. In this way, the image capture device 100 increases the response speed of the shutter button 261 without interfering with the communication with the external device connected to the USB connection unit 311 of the accessory device 200 based on the USB 3.1 standard, and a user is less likely to miss a shutter release opportunity.

FIG. 9 is a flowchart illustrating an example of a control method of the image capture device 100. In an initial state, the system control unit 150 controls the switching unit 190 and sets signal allocation to the terminals A1 to A12 and B1 to B12 of the USB connection unit 110 as illustrated in FIG. 7C. The switching unit 190 connects the terminals A2, A3, A8, A10, A11, B2, B3, B5, B6, B7, B8, B10, and B11 of the USB connection unit 110 to the system control unit 150 via the USB communication unit 154 as illustrated in FIG. 8B.

The image capture device 100 performs steps S501 to S504 as in FIG. 5. In step S504, if the system control unit 150 determines that the connected external device is the accessory device 200 capable of outputting an image capture instruction signal (YES in step S504), the system control unit 150 advances the process to step S905. If the system control unit 150 determines that the connected external device is not the accessory device 200 capable of outputting an image capture instruction signal (NO in step S504), the flowchart in FIG. 9 is ended.

In step S905, the system control unit 150 determines whether the operation mode of the image capture device 100 is the still image capture mode. If the system control unit 150 determines that the operation mode of the image capture device 100 is the still image capture mode (YES in step S905), the system control unit 150 advances the process to step S906. If the system control unit 150 determines that the operation mode of the image capture device 100 is not the still image capture mode (NO in step S905), the flowchart in FIG. 9 is ended.

In step S906, the system control unit 150 controls the USB communication unit 154 so that the USB communication unit 154 transmits an allocation information request signal to the accessory device 200. The USB communication unit 154 transmits the allocation information request signal to the accessory device 200 via the USB connection unit 110.

The allocation information request signal is, for example, a signal for requesting the first or second allocation information. The first allocation information is information for issuing an instruction to set signal allocation as illustrated in FIG. 7A. The second allocation information is information for issuing an instruction to set signal allocation as illustrated in FIG. 7C.

If the accessory device 200 receives the allocation information request signal from the image capture device 100, the accessory device 200 transmits the first or second allocation information to the image capture device 100. Details thereof will be described below with reference to FIG. 10.

In step S907, the system control unit 150 receives allocation information from the accessory device 200 via the USB communication unit 154 and the USB connection unit 110.

In step S908, in a case where the system control unit 150 receives the first allocation information from the accessory device 200, the system control unit 150 controls the switching unit 190 and sets the signal allocation in FIG. 7A to the terminals A1 to A12 and B1 to B12 of the USB connection unit 110. The switching unit 190 connects the terminals A2, A3, A8, A10, A11, B2, B3, B5, B6, B7, B8, B10, and B11 of the USB connection unit 110 to the system control unit 150 as illustrated in FIG. 8A.

In a case where the system control unit 150 receives the second allocation information from the accessory device 200, the system control unit 150 controls the switching unit 190 and sets the signal allocation in FIG. 7C to the terminals A1 to A12 and B1 to B12 of the USB connection unit 110. The switching unit 190 connects the terminals A2, A3, A8, A10, A11, B2, B3, B5, B6, B7, B8, B10, and B11 of the USB connection unit 110 to the system control unit 150 via the USB communication unit 154 as illustrated in FIG. 8B. Then, the flowchart in FIG. 9 is ended.

Figure 10:
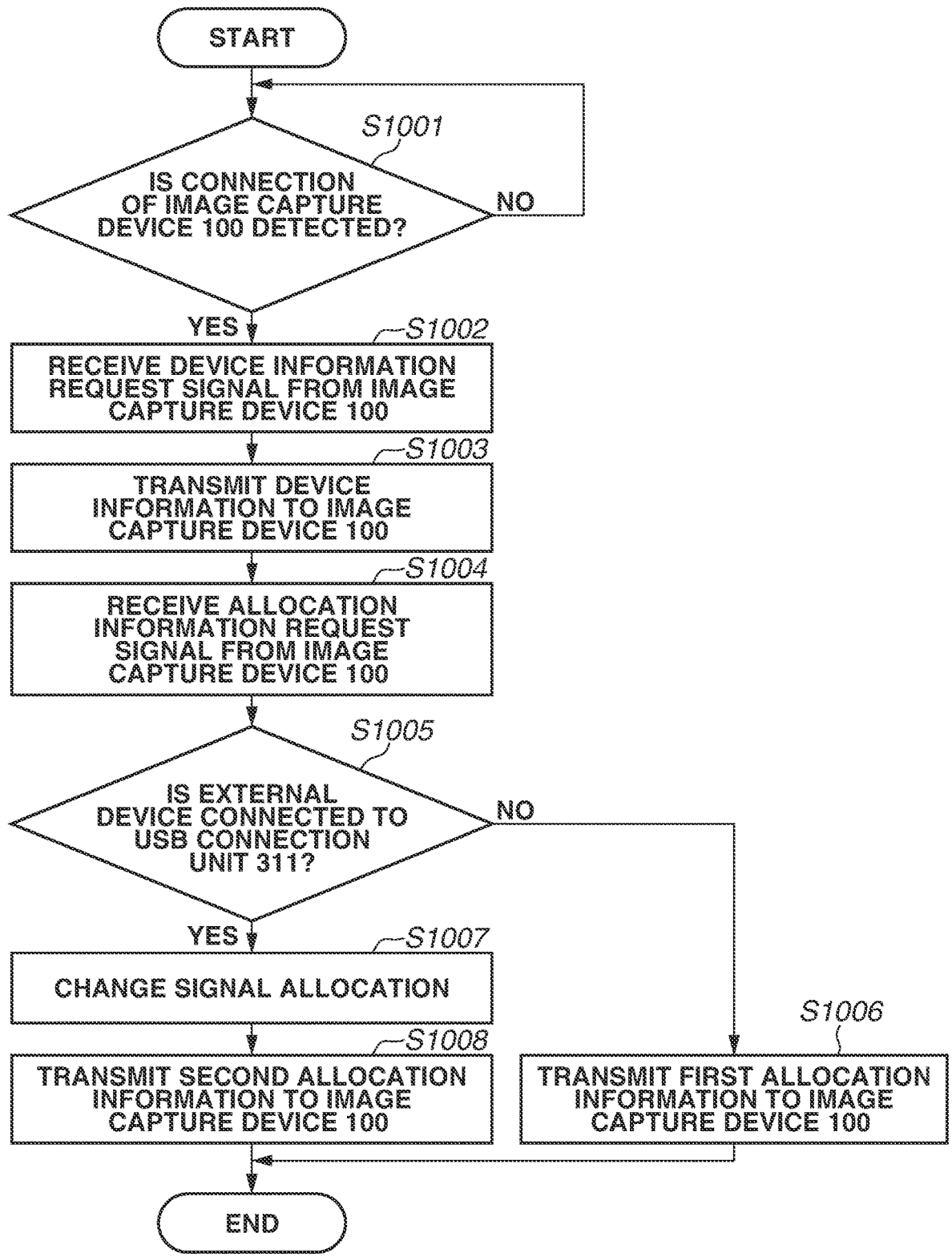
FIG. 10 is a flowchart illustrating a control method of the accessory device 200.

FIG. 10 is a flowchart illustrating an example of a control method of the accessory device 200. In an initial state, the system control unit 250 controls the switching unit 390 and sets the signal allocation to the terminals A1 to A12 and B1 to B12 of the USB connection unit 210 as illustrated in FIG. 7B. The switching unit 390 connects the terminals A2, A3, A8, A10, A11, B2, B3, B5, B8, B10, and B11 of the USB connection unit 210 to the operation unit 270 as illustrated in FIG. 8A. The switching unit 390 is to connect at least one of the terminals A1 to A12 and B1 to B12 of the USB connection unit 210 to the operation unit 270.

In step S1001, the system control unit 250 detects whether the image capture device 100, which is the external device, is connected to the USB connection unit 210 via the USB communication unit 254. If the system control unit 250 does not detect that the image capture device 100 is connected to the USB connection unit 210 (NO in step S1001), the system control unit 250 waits until the system control unit 250 detects that the image capture device 100 is connected to the USB connection unit 210. If the system control unit 250 detects that the image capture device 100 is connected to the USB connection unit 210 (YES in step S1001), the system control unit 250 proceeds to step S1002.

In step S1002, the system control unit 250 receives the device information request signal transmitted from the image capture device 100 in step S502 in FIG. 9 via the USB connection unit 210 and the USB communication unit 254.

In step S1003, the system control unit 250 responds to the device information request signal and controls the USB communication unit 254 so that device information is transmitted to the image capture device 100. The USB communication unit 254 transmits the device information stored in the non-volatile memory 256 to the image capture device 100 via the USB connection unit 210. The device information is identification information about the accessory device 200 and is, for example, a device ID.

In step S1004, the system control unit 250 receives the allocation information request signal transmitted from the image capture device 100 in step S906 in FIG. 9 via the USB connection unit 210 and the USB communication unit 254.

In step S1005, the system control unit 250 determines whether the external device 400 is connected to the USB connection unit 311 using the USB communication unit 254. If the system control unit 250 determines that the external device 400 is connected to the USB connection unit 311 (YES in step S1005), the system control unit 250 proceeds to step S1007. If the system control unit 250 determines that the external device 400 is not connected to the USB connection unit 311 (NO in step S1005), the system control unit 250 proceeds to step S1006.

In step S1006, the system control unit 250 refers to the table information stored in the non-volatile memory 256 and controls the USB communication unit 254 so that the first allocation information is transmitted to the image capture device 100. The USB communication unit 254 transmits the first allocation information to the image capture device 100 via the USB connection unit 210. The first allocation information is information that indicates that the external device 400 is not connected to the USB connection unit 311 and is information for issuing an instruction to set the signal allocation as illustrated in FIG. 7A. Then, the flowchart in FIG. 10 is ended.

In step S908 in FIG. 9, if the system control unit 150 receives the first allocation information, the system control unit 150 controls the switching unit 190 so that at least one of the terminals A1 to A12 and B1 to B12 of the USB connection unit 110 are connected to the system control unit 150 as illustrated in FIG. 8A.

In step S1007 in FIG. 10, the system control unit 250 controls the switching unit 390 so that the signal allocation to the terminals A1 to A12 and B1 to B12 of the USB connection unit 210 in FIG. 7B is changed to the signal allocation to the terminals A1 to A12 and B1 to B12 of the USB connection unit 210 in FIG. 7D. The switching unit 390 connects the terminals A2, A3, A8, A10, A11, B2, B3, B5, B8, B10, and B11 of the USB connection unit 210 to the operation unit 270 via the USB communication unit 254 and the system control unit 250 as illustrated in FIG. 8B. The switching unit 390 is to connect at least one of the terminals A1 to A12 and B1 to B12 of the USB connection unit 210 to the operation unit 270 via the USB communication unit 254 and the system control unit 250.

In step S1008, the system control unit 250 refers to the table information stored in the non-volatile memory 256 and controls the USB communication unit 254 so that the second allocation information is transmitted to the image capture device 100. The USB communication unit 254 transmits the second allocation information to the image capture device 100 via the USB connection unit 210. The second allocation information is information that indicates that the external device 400 is connected to the USB connection unit 311 and is information for issuing an instruction to set the signal allocation as illustrated in FIG. 7C. Then, the flowchart in FIG. 10 is ended.

In step S908 in FIG. 9, if the system control unit 150 receives the second allocation information, the system control unit 150 controls the switching unit 190 as illustrated in FIG. 8B. The system control unit 150 controls the switching unit 190 so that at least one of the terminals A1 to A12 and B1 to B12 of the USB connection unit 110 are connected to the system control unit 150 via the USB communication unit 154 as illustrated in FIG. 8B.

While the accessory device 200 is described as a battery grip in the first and second exemplary embodiments, the accessory device 200 can be an accessory device capable of outputting an image capture instruction signal, such as a remote controller. While the USB connection units 110, 210, and 311 are described as USB Type-C connectors, the USB connection units 110, 210, and 311 can be connection units of any other type. The image capture device 100 is not limited to a device that operates as a digital camera or a digital video camera and can be a device that operates as a smartphone, a tablet, an industrial camera, a medical camera, or an in-vehicle camera.

In the first and second exemplary embodiments, the image capture device 100 can be connected to the accessory device 200 via the USB connection units 110 and 210. With the image capture device 100, the response speed of the shutter button 261 or the operation unit 270 of the accessory device 200 becomes substantially equal to the response speed of the shutter button 161 or the operation unit 170 of the image capture device 100. The image capture device 100 and the accessory device 200 employ the USB connection units 110 and 210 so that versatility increases and the response speeds of the shutter button 261 and the operation unit 270 increase.

[Third Exemplary Embodiment] The various functions, processes, or methods described above in the first and second exemplary embodiments can also be implemented by a personal computer, a microcomputer, a central processing unit (CPU), or a processor with a program. In a third exemplary embodiment described below, a personal computer, a microcomputer, a CPU, and a processor will be referred to as a computer X. Further, in the third exemplary embodiment, a program for controlling the computer X and implementing the various functions, processes, or methods described above in the first and second exemplary embodiments will be referred to as a program Y.

The computer X executes the program Y to implement the various functions, processes, or methods described above in the first and second exemplary embodiments. In this case, the program Y is supplied to the computer X via a computer-readable storage medium. The computer-readable storage medium according to the third exemplary embodiment includes at least one of a hard disk apparatus, a magnetic storage apparatus, an optical storage apparatus, a magneto-optical storage apparatus, a memory card, a volatile memory, and a non-volatile memory. The computer-readable storage medium according to the third exemplary embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2019-079485, filed Apr. 18, 2019, which is hereby incorporated by reference herein in its entirety.

What is claimed is:

1. An electronic device comprising:
    a connection unit including a first group of terminals and a second group of terminals;
    a communication unit connected to the first group of terminals, and configured to communicate with an external device connected to the connection unit;
    a control unit configured to control the electronic device; and
    a selecting unit connected to the second group of terminals, the communication unit and the control unit, and configured to select one of the communication unit and the control unit,
    wherein the selecting unit (a) selects the communication unit to connect the second group of terminals and the communication unit in a case where the external device is not connected to the connection unit, (b) selects the communication unit to connect the second group of terminals and the communication unit in a case where the external device connected to the connection unit is not a predetermined device, and (c) selects the control unit to connect the second group of terminals and the control unit in a case where the external device connected to the connection unit is the predetermined device.

2. The electronic device according to claim 1, wherein the communication unit is connected with the second group of terminals via the selecting unit and the control unit is not connected with the second group of terminals via the selecting unit, in the case where the external device is not connected to the connection unit,
    wherein the communication unit is connected with the second group of terminals via the selecting unit and the control unit is not connected with the second group of terminals via the selecting unit, in the case where the external device connected to the connection unit is not the predetermined device, and
    wherein the control unit is connected with the second group of terminals via the selecting unit and the communication unit is not connected with the second group of terminals via the selecting unit, in the case where the external device connected to the connection unit is the predetermined device.

3. The electronic device according to claim 1, wherein the control unit determines whether the external device connected to the connection unit is the predetermined device based on information about the external device received from the external device via the communication unit.

4. The electronic device according to claim 1, wherein one terminal included in the second group of terminals is used to receive, from the predetermined device, an instruction to capture an image.

5. A method comprising:
    selecting a communication unit of an electronic device to connect a second group of terminals included in a connection unit of the electronic device and the communication unit in a case where an external device is not connected to the connection unit;
    selecting the communication unit to connect the second group of terminals and the communication unit in a case where the external device connected to the connection unit is not a predetermined device; and
    selecting a control unit of the electronic device to connect the second group of terminals and the control unit, in a case where the external device connected to the connection unit is the predetermined device,
    wherein the connection unit includes a first group of terminals and the second group of terminals, the communication unit is connected to the first group of terminals, and is configured to communicate with the external device connected to the connection unit, the control unit is configured to control the electronic device, and the selecting unit is connected to the second group of terminals, the communication unit and the control unit, and is configured to select one of the communication unit and the control unit.

6. A non-transitory storage medium storing a program that causes a computer to execute a method, the method comprising:

selecting a communication unit of an electronic device to connect a second group of terminals included in a connection unit of the electronic device and the communication unit in a case where an external device is not connected to the connection unit;

selecting the communication unit to connect the second group of terminals and the communication unit in a case where the external device connected to the connection unit is not a predetermined device; and selecting a control unit of the electronic device to connect the second group of terminals and the control unit, in a case where the external device connected to the connection unit is the predetermined device, wherein the connection unit includes a first group of terminals and the second group of terminals, the communication unit is connected to the first group of terminals, and is configured to communicate with the external device connected to the connection unit, the control unit is configured to control the electronic device, and the selecting unit is connected to the second group of terminals, the communication unit and the control unit, and is configured to select one of the communication unit and the control unit.

7. The electronic device according to claim 1, wherein the electronic device is capable of acting as a digital camera.

8. The electronic device according to claim 1, wherein the connection unit includes USB (Universal Serial Bus) Type-C connector.

9. The electronic device according to claim 1, wherein the predetermined device is capable of acting as an apparatus providing an instruction to capture an image to the electronic device.

10. The electronic device according to claim 1, wherein the predetermined device includes an operation unit that is used to operate the electric device.

11. The method according to claim 5, wherein the communication unit is connected with the second group of terminals via the selecting unit and the control unit is not connected with the second group of terminals via the selecting unit, in the case where the external device is not connected to the connection unit, wherein the communication unit is connected with the second group of terminals via the selecting unit and the control unit is not connected with the second group of terminals via the selecting unit, in the case where the external device connected to the connection unit is not the predetermined device, and wherein the control unit is connected with the second group of terminals via the selecting unit and the communication unit is not connected with the second group of terminals via the selecting unit, in the case where the external device connected to the connection unit is the predetermined device.

12. The method according to claim 5, further comprising determining whether the external device connected to the connection unit is the predetermined device based on information about the external device received from the external device via the communication unit.

13. The method according to claim 5, wherein one terminal included in the second group of terminals is used to receive, from the predetermined device, an instruction to capture an image.

14. The method according to claim 5, wherein the electronic device is capable of acting as a digital camera.

15. The method according to claim 5, wherein the connection unit includes USB (Universal Serial Bus) Type-C connector.

16. The method according to claim 5, wherein the predetermined device is capable of acting as an apparatus providing an instruction to capture an image to the electronic device.

17. The method according to claim 5, wherein the predetermined device includes an operation unit that is used to operate the electric device.

* * * * *